(12) United States Patent
Sridharan et al.

(10) Patent No.: US 9,935,920 B2
(45) Date of Patent: Apr. 3, 2018

(54) VIRTUALIZATION GATEWAY BETWEEN VIRTUALIZED AND NON-VIRTUALIZED NETWORKS

(71) Applicant: Microsoft Technology Licensing, LLC, Redmond, WA (US)

(72) Inventors: Murari Sridharan, Chennai (IN); David A. Maltz, Redmond, WA (US); Narasimhan Venkataramaiah, Redmond, WA (US); Parveen K. Patel, Redmond, WA (US); Yu-Shun Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 15/007,215

(22) Filed: Jan. 27, 2016

(65) Prior Publication Data
US 2016/0241513 A1    Aug. 18, 2016

Related U.S. Application Data

(63) Continuation of application No. 13/210,510, filed on Aug. 16, 2011, now Pat. No. 9,274,825.

(51) Int. Cl.
*G06F 9/455* (2006.01)
*H04L 29/12* (2006.01)
(Continued)

(52) U.S. Cl.
CPC ...... *H04L 61/2596* (2013.01); *G06F 9/45558* (2013.01); *H04L 12/4604* (2013.01);
(Continued)

(58) Field of Classification Search
CPC .................................................. G06F 9/45558
See application file for complete search history.

(56) References Cited

U.S. PATENT DOCUMENTS 7,353,295 B1 * 4/2008 Crow .................. H04L 67/16
                                                              370/359
7,680,919 B2    3/2010 Nelson
(Continued)

FOREIGN PATENT DOCUMENTS

CN    1602003 A    3/2005
CN    101133612 A    2/2008
(Continued)

OTHER PUBLICATIONS

"Cisco Virtualized Multi-Tenant Data Center, Version 2.0", Retrieved from <<http://www.cisco.com/c/en/us/td/docs/solutions/Enterprise/Data_Center/VMDC/2-0/design_guide/vmdcDesignGuideCompactPoD20.pdf>>, Oct. 20, 2010, 94 Pages.
(Continued)

*Primary Examiner* — Charlie Sun

(57) ABSTRACT

Methods and apparatus are provided for controlling communication between a virtualized network and non-virtualized entities using a virtualization gateway. A packet is sent by a virtual machine in the virtualized network to a non-virtualized entity. The packet is routed by the host of the virtual machine to a provider address of the virtualization gateway. The gateway translates the provider address of the gateway to a destination address of the non-virtualized entity and sends the packet to the non-virtualized entity. The non-virtualized entity may be a physical resource, such as a physical server or a storage device. The physical resource may be dedicated to one customer or may be shared among customers.

19 Claims, 12 Drawing Sheets

(51) Int. Cl.
    H04L 12/46     (2006.01)
    H04L 29/08     (2006.01)
    H04L 12/741    (2013.01)
    H04L 29/06     (2006.01)

(52) U.S. Cl.
    CPC .......... *H04L 12/4633* (2013.01); *H04L 45/74* (2013.01); *H04L 61/2503* (2013.01); *H04L 65/102* (2013.01); *H04L 67/1002* (2013.01); *G06F 2009/45595* (2013.01)

(56) References Cited

U.S. PATENT DOCUMENTS

| | | | |
|---|---|---|---|
| 2002/0116397 | A1* | 8/2002 | Berg ................ H04L 29/06 |
| 2003/0069016 | A1 | 4/2003 | Bahl et al. |
| 2003/0140193 | A1 | 7/2003 | Acharya et al. |
| 2004/0174887 | A1 | 9/2004 | Lee |
| 2005/0063393 | A1 | 3/2005 | Lin |
| 2007/0006286 | A1 | 1/2007 | Singhal |
| 2007/0061462 | A1 | 3/2007 | Kim et al. |
| 2007/0266383 | A1 | 11/2007 | White |
| 2007/0283348 | A1 | 12/2007 | White |
| 2008/0186990 | A1 | 8/2008 | Abali et al. |
| 2008/0270564 | A1 | 10/2008 | Rangegowda et al. |
| 2009/0259759 | A1 | 10/2009 | Miyajima |
| 2009/0327471 | A1 | 12/2009 | Astete et al. |
| 2010/0031253 | A1 | 2/2010 | Adams et al. |
| 2010/0071025 | A1 | 3/2010 | Devine et al. |
| 2010/0153514 | A1 | 6/2010 | Dabagh et al. |
| 2010/0205252 | A1 | 8/2010 | Dorai et al. |
| 2010/0257269 | A1 | 10/2010 | Clark |
| 2010/0287548 | A1 | 11/2010 | Zhou et al. |
| 2010/0306408 | A1 | 12/2010 | Greenberg et al. |
| 2011/0035494 | A1 | 2/2011 | Pandey et al. |
| 2011/0075664 | A1 | 3/2011 | Lambeth et al. |
| 2011/0211553 | A1 | 9/2011 | Haddad |
| 2011/0292946 | A1 | 12/2011 | Flinta et al. |
| 2012/0014387 | A1 | 1/2012 | Dunbar et al. |
| 2012/0099602 | A1 | 4/2012 | Nagapudi et al. |
| 2012/0147894 | A1 | 6/2012 | Mulligan et al. |
| 2012/0185082 | A1 | 7/2012 | Toebes et al. |
| 2012/0246637 | A1 | 9/2012 | Kreeger et al. |
| 2012/0290719 | A1 | 11/2012 | Lee |
| 2012/0291034 | A1 | 11/2012 | Kamath et al. |
| 2012/0311568 | A1 | 12/2012 | Jansen |
| 2012/0317252 | A1 | 12/2012 | Vemulapalli et al. |
| 2013/0042238 | A1 | 2/2013 | Cardona et al. |

FOREIGN PATENT DOCUMENTS

| | | | |
|---|---|---|---|
| CN | 101252509 | A | 8/2008 |
| CN | 101951418 | A | 1/2011 |
| CN | 102726021 | A | 10/2012 |
| JP | H0730544 | A | 1/1995 |
| JP | 2009253811 | A | 10/2009 |
| JP | 2009278261 | A | 11/2009 |
| JP | 2012505591 | A | 3/2012 |
| WO | 2010041996 | A1 | 4/2010 |

OTHER PUBLICATIONS

"New VMware vShield™ Zones to Deliver Security and Compliance Across the Datacenter", Retrieved from <<https://www.vmware.com/company/news/releases/vshield-security-vmworld>>, Mar. 29, 2011, 2 Pages.

"Virtualization, Isolation and Encryption ofiP Video Surveillance", Retrieved from <<http://www.cisco.com/c/en/us/td/docs/solutions/Enterprise/Video/IPVS/ip_video_surv/ipvs_virtual.html>>, Mar. 29, 2011, 15 Pages.

"Final Office Action Issued in U.S. Appl. No. 13/210,510", dated Dec. 16, 2013, 27 Pages.

"Final Office Action Issued in U.S. Appl. No. 13/210,510", dated Jan. 15, 2015, 35 Pages.

"Non Final Office Action Issued in U.S. Appl. No. 13/210,510", dated Jul. 2, 2014, 33 Pages.

"Non Final Office Action Issued in U.S. Appl. No. 13/210,510", dated Jun. 18, 2013, 17 Pages.

"Notice of Allowance Issued in U.S. Appl. No. 13/210,510", dated Oct. 28, 2015, 15 Pages.

"Office Action Issued in Japanese Patent Application No. 2014-525986", dated Apr. 12, 2016, 6 Pages.

Carbone, Janique, "Live Migration in Windows Server 2008 R2 Hyper-V", Retrieved from <<http://www.virtualizationadmin.com/articles-tutorials/microsoft-hyper-v-articles/load-balancing-high-availability/live-migration-windows-server-2008-r2-hyper-v.html>>, May 5, 2009, 4 Pages.

Casado, et al., "Virtualizing the Network Forwarding Plane", In Proceedings of the Workshop on Programmable Routers for Extensible Services of Tomorrow, Nov. 30, 2010, 6 Pages.

Girola, et al., "IBM Data Center Networking: Planning for Virtualization and Cloud Computing", Retrieved from <<http://www.redbooks.ibm.com/redbooks/pdfs/sg247928.pdf>>, Feb. 10, 2011, 258 Pages.

Harney, et al., "The Efficacy of Live Virtual Machine Migrations Over the Internet", In Proceedings of the 2nd international Workshop on Virtualization technology in distributed computing, Nov. 12, 2007, 7 Pages.

Kullberg, Elis, "Live Migration of Virtual Machines: Sustaining active TCP-Sessions", Retrieved from <<https://www.kth.se/social/files/5546417ef2765477b39c6c2e/IK1550_kullberg_v2.pdf>>, Sep. 3, 2009, 21 Pages.

"International Search Report and Written Opinion Issued in PCT Application No. PCT/US2011/055659", dated Aug. 29, 2012, 9 Pages.

Pfaff, et al., "Extending Networking into the Virtualization Layer", Retrieved from <<http://conferences.sigcomm.org/hotnets/2009/papers/hotnets2009-final143_pdf>>, Oct. 2009, 6 Pages.

Pisa, et al., "Migrating Xen Virtual Routers with No Packet Loss", Retrieved From <<http://www.gta.ufrj.br/ftp/gta/TechReports/PMC10.pdf>>, Retrieved on: Mar. 30, 2011, 1 Page.

Sundararaj, et al., "Towards Virtual Networks for Virtual Machine Grid Computing", In Proceedings of the Third Virtual machine research and technology symposium. 2004, May 6, 2004, 14 Pages.

Wang, et al., "Virtual Routers on the Move: Live Router Migration as a Network-Management Primitive", In Proceedings of ACM SIGCOMM 2008 conference on Data communication, Aug. 17, 2008, 13 pages.

Office Action Issued in China Patent Application No. 201180072872.3, dated Jun. 17, 2016, 5 Pages.

"Office Action Issued in Japanese Patent Application No. 2014-525986", dated Aug. 4, 2015, 3 Pages. (w/o English Translation).

"Supplementary Search Report Issued in European Patent Application No. 11870996.3", dated Jun. 26, 2015, 8 Pages.

"First Office Action and Search Report Issued in Chinese Patent Application No. 201180072872.3", dated Dec. 3, 2014, 13 Pages.

"Second Office Action and Search Report Issued in Chinese Patent Application No. 201180072872.3", dated Sep. 2, 2015, 11 Pages.

"Third Office Action Issued in Chinese Patent Application No. 201180072872.3", dated Feb. 3, 2016, 13 Pages.

"Network Address Translation", Retrieved From <<https://en.wikipedia.org/w/index.php?title=Network_address_translation&oldid=442836098>>, Published on: Aug. 3, 2011, 13 Pages.

Greenberg, et al., "VL2: A Scalable and Flexible Data Center Network", In Proceedings of the ACM SIGCOMM Conference on Data Communication, vol. 39, Issue 4, Aug. 17, 2009, 10 Pages.

"Fourth Office Action Issued in Chinese Patent Application No. 201180072872.3", dated Sep. 29, 2017, 7 Pages.

\* cited by examiner

VIRTUALIZATION GATEWAY BETWEEN VIRTUALIZED AND NON-VIRTUALIZED NETWORKS

RELATED APPLICATION

This application is a continuation patent application of copending application with Ser. No. 13/210,510, filed Aug. 16, 2011, entitled "VIRTUALIZATION GATEWAY BETWEEN VIRTUALIZED AND NON-VIRTUALIZED NETWORKS", which is now allowed. The aforementioned application(s) are hereby incorporated herein by reference.

FIELD OF THE INVENTION

This invention relates to virtualization gateways that bridge communication between virtualized networks and non-virtualized networks and, more particularly, to methods and apparatus for controlling communication between a virtualized network and a non-virtualized entity, such as between a virtual machine and a physical server.

BACKGROUND OF INVENTION

Data centers may include several hundred or several thousand servers interconnected by high-speed switches and routers. Cloud data centers may provide a variety of services, such as web applications, e-mail services, search engine services, etc., for a plurality of customers. In recent years, data centers have transformed computing, with large scale consolidation of enterprise IT into data center hubs and with the emergence of cloud computing service providers.

Virtual machine (VM) technology allows one or more operating systems, or virtual machines, to run concurrently on one physical host, or physical machine. The advantages of virtual machine technology have become widely recognized. Among these advantages are the ability to run multiple virtual machines on a single host and the ability to migrate virtual machines from one host to another.

There is a need for cloud data centers to support multi-tenant or multi-organization network isolation while maintaining customer addresses across premises of various scopes. Customers need to move services from corporate networks to cloud data centers without disrupting services due to address renumbering, and data center administrators need the flexibility to migrate or consolidate work loads without reconfiguring the networks or disrupting services. To satisfy these requirements, cloud data centers need to accommodate potentially overlapping customer addresses.

In virtualized networks, a virtual machine may communicate with physical resources, such as storage devices, which are not virtualized. The physical resources may be located within the data center, at a customer location or at another data center. The physical resources may be dedicated to one customer or may be shared among customers. The virtual machine and the physical resources may utilize different addressing schemes.

SUMMARY OF INVENTION

It has been proposed to use policy-controlled network virtualization to decouple application or customer addresses from physical or provider addresses while maintaining the mapping between the two sets of addresses. This allows customers to maintain customer addresses while moving services across subnets or premises. It also allows data center administrators to consolidate and migrate services within and across subnets without disrupting services and enables data center providers to accommodate overlapping address spaces from customers.

The present invention provides methods and apparatus for controlling communication between a virtualized network and non-virtualized entities using a virtualization gateway. A packet is sent by a virtual machine in the virtualized network to a non-virtualized entity. The packet is routed by the host of the virtual machine to a provider address of the virtualization gateway. The gateway translates the provider address of the gateway to a destination address of the non-virtualized entity and sends the packet to the non-virtualized entity.

In some embodiments, the non-virtualized entity comprises a physical server having a customer address in the address space of the virtualized network. The gateway translates the provider address of the gateway to the customer address of the physical server. In such embodiments, the physical server may be dedicated to the virtualized network In further embodiments, the non-virtualized entity comprises a physical server having a provider address. The gateway translates the provider address of the gateway by performing network address translation. In such embodiments, the physical server may be shared among customers. The network address translation may comprise performing a first network address translation in response to a packet received from a virtual machine in a first virtual network and performing a second network address translation in response to a packet received from a virtual machine in a second virtual network.

In further embodiments, translating the provider address of the gateway comprises accessing a virtual network policy containing a mapping policy that maps the provider address of the gateway to the address of the non-virtualized entity. The gateway may receive a mapping policy update from a virtual machine manager of the virtualized network. The mapping policy update may reflect mapping policy changes in the virtualized network.

In further embodiments, the gateway may receive a packet sent by the non-virtualized entity to the virtual machine in the virtualized network. The gateway translates a customer address of the virtual machine to a provider address of the virtual machine and sends the packet to the provider address of the virtual machine in the virtualized network.

According to an aspect of the invention, a method is provided for controlling communication between a virtualized network and a non-virtualized entity. The method comprises receiving, by a virtualization gateway, a packet sent by a virtual machine in the virtualized network to the non-virtualized entity and routed to a provider address of the gateway by a host of the virtual machine; translating, by the gateway, the provider address of the gateway to a destination address of the non-virtualized entity; and sending, by the gateway, the packet to the non-virtualized entity.

According to another aspect of the invention, a virtualization gateway is provided for controlling communication between a virtualized network and a non-virtualized entity. The virtualization gateway comprises a processing device and a storage device encoded with instructions that, when executed by the processing device, are configured to: receive a packet sent by a virtual machine in the virtualized network to the non-virtualized entity and routed to a provider address of the gateway by a host of the virtual machine; translate the provider address of the gateway to a destination address of the non-virtualized entity; and send the packet to the non-virtualized entity.

According to a further aspect of the invention, a method is provided for controlling communication between a virtualized network and a non-virtualized entity. The method comprises receiving, by a host, a packet sent by a virtual machine to the non-virtualized entity at a destination address; translating, by the host, the destination address of the packet to a provider address of a virtualization gateway; and sending, by the host, the packet to the provider address of the virtualization gateway for address translation and sending to the non-virtualized entity.

BRIEF DESCRIPTION OF DRAWINGS

For a better understanding of the present invention, reference is made to the accompanying drawings, which are incorporated herein by reference and in which.

DETAILED DESCRIPTION

Figure 1:
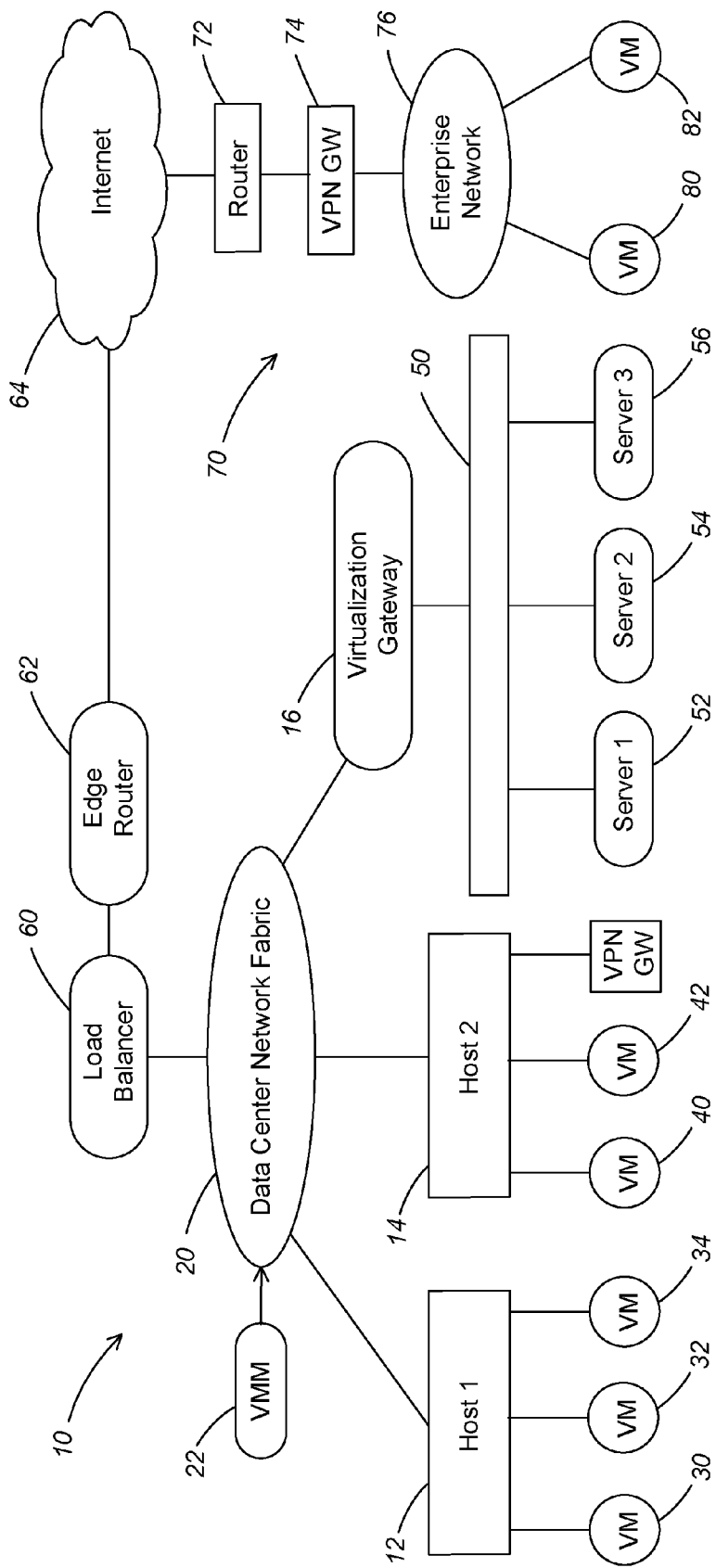
FIG. 1 is a schematic block diagram of an embodiment of a data center connected to a customer system.

A simplified schematic block diagram of an embodiment of a data center incorporating features of the invention is shown in FIG. 1. A data center 10 may include a first host 12, a second host 14 and a virtualization gateway 16 interconnected by a data center network fabric 20. As used herein, the term "host" refers to a physical machine, typically a server or other computing device as shown, for example, in FIG. 12 and described below. The data center further includes a virtual machine manager 22. Included in the tasks of virtual machine manager 22 are provisioning and updating of mapping policies to hosts 12 and 14 and virtualization gateway 16 as described below.

Each of the hosts in data center 10 may host one or more virtual machines (VM), which may include a complete operating system capable of running applications independently of other virtual machines. As shown in FIG. 1, first host 12 hosts virtual machines 30, 32 and 34, and second host 14 hosts virtual machines 40 and 42.

Each of the hosts in data center 10 may include a switch to route data packets to and from the virtual machines in the host. In the case of a single virtual machine, a switch may not be required. Each of the virtual machines may include a network adapter for external communication via the host in which it resides. Each of the hosts further includes a virtualization module for address translation during communication to and from the virtual machines in the host.

In the example of FIG. 1, virtual machines 30 and 42 are part of a first virtual network, or isolation group, virtual machines 32 and 40 are part of a second virtual network, or isolation group, and virtual machine 34 is part of a third virtual network, or isolation group. The three virtual networks may correspond to three different customers of the data center and are isolated from each other, even though virtual machines of the three virtual networks may be hosted by the same host. Each virtual network may include additional virtual machines (not shown) on the same or different hosts. Further, data center 10 may host additional virtual networks.

As further shown in FIG. 1, virtualization gateway 16 is connected through a physical network 50 to physical servers 52, 54 and 56. Each of the physical servers 52, 54 and 56 may be, for example, a storage device or other non-virtualized physical resource. The virtualization gateway 16 facilitates communication between one or more of the virtual machines and one or more of the physical servers. In some embodiments, physical servers 52, 54 and 56 may be dedicated to one virtual network, such as the virtual network including virtual machines 30 and 42. In other embodiments, the physical servers 52, 54 and 56 may be shared among two or more virtual networks.

As further shown in FIG. 1, data center 10 is connected via a load balancer 60, an edge router 62 and the Internet 64 to a customer system 70. In the embodiment of FIG. 1, customer system 70 includes a router 72, a VPN gateway 74 and enterprise network 76, which hosts virtual machines 80 and 82. It will be understood that customer system 70 may have any configuration. In the embodiment of FIG. 1, the first virtual network, including virtual machines 30 and 42, in data center 10 is dedicated to customer system 70.

Figure 2:
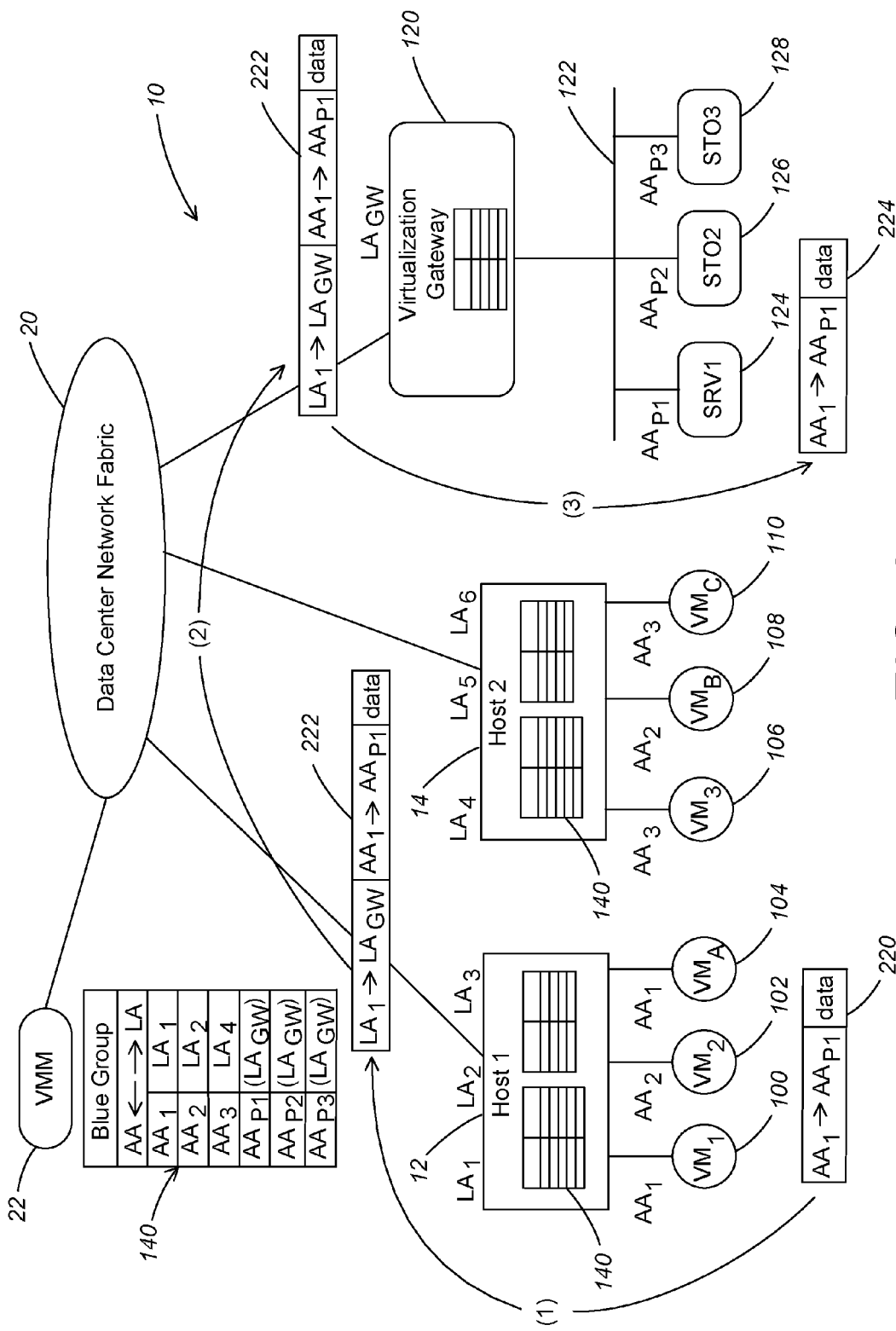
FIG. 2 is a schematic block diagram of an embodiment of a data center, illustrating communication between a virtual machine and a dedicated physical server through a virtualization gateway.
Figure 3:
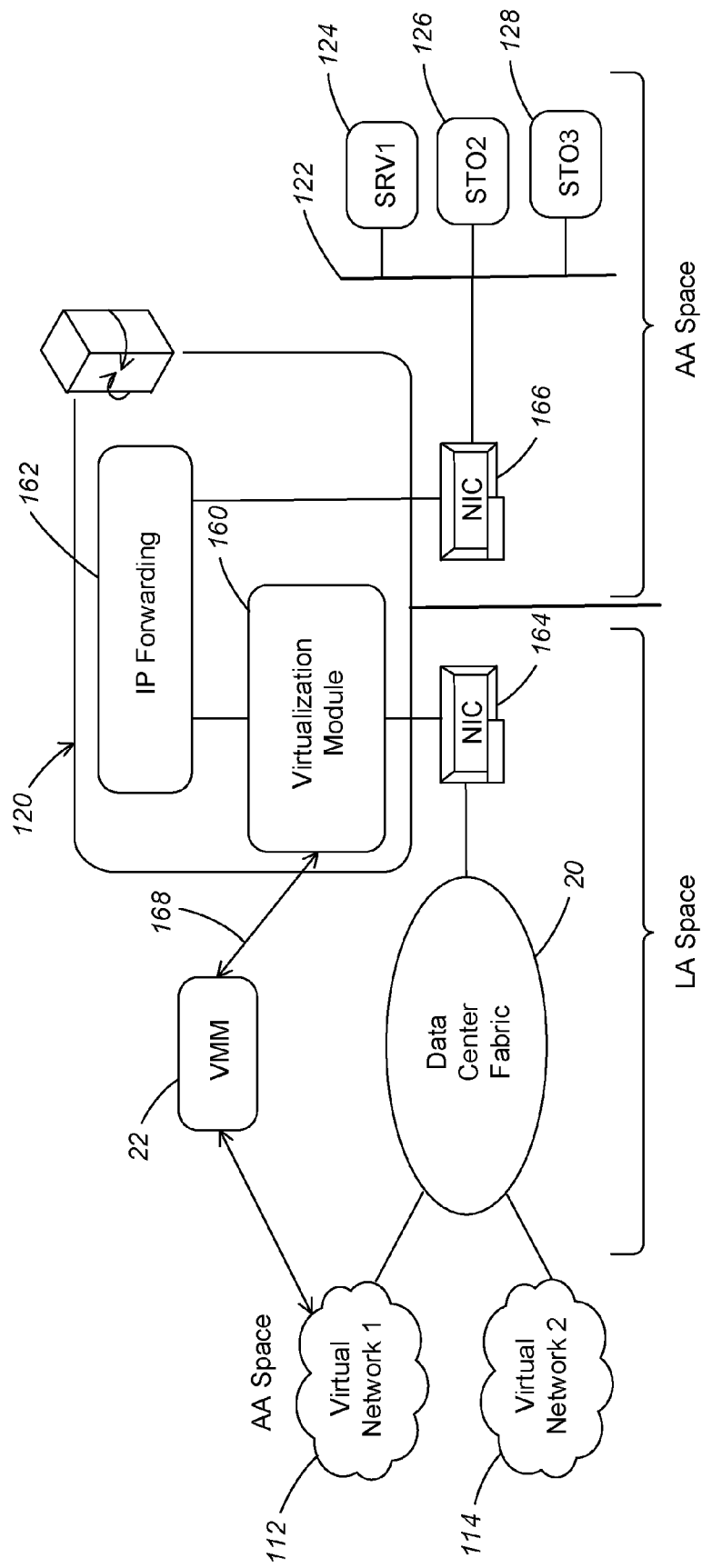
FIG. 3 is a schematic block diagram, illustrating an embodiment of the virtualization gateway of FIG. 2.

A second embodiment of data center 10 is shown in FIGS. 2 and 3. In the embodiment of FIGS. 2 and 3, first host 12 hosts virtual machines 100, 102 and 104, and second host 14 hosts virtual machines 106, 108 and 110. Virtual machines 100, 102 and 106 are elements of a first virtual network 112 (FIG. 3), and virtual machines 104, 108 and 110 are elements of a second virtual network 114. Virtualization gateway 120 is coupled by a network 122 to a physical server 124 and storage devices 126 and 128.

As shown in FIG. 2, each virtual machine is associated with a customer address AA (application address) and a provider address LA (location or physical address). The customer address AA corresponds to the IP address of the virtual machine, and the provider address LA corresponds to the physical location of the virtual machine in data center 10. Thus, for example, virtual machine 100 in first host 12 has a customer address $AA_1$ and a provider address $LA_1$. Two or more virtual machines may have the same customer address AA, but the provider address LA of each virtual machine is unique in data center 10. Together, the customer address $AA_1$ and the provider address $LA_1$ form an address pair $AA_1$:$LA_1$, which defines a mapping policy for virtual machine 100. The mapping policy is used to control communications between virtual machines and to control communications between a virtual machine and a non-virtualized entity, as discussed below. The customer address AA is used by the virtual machines, whereas the provider address LA is used by the physical machines, such as hosts.

A number of mapping policies for a virtual network may be grouped in a virtual network policy, such as virtual network policy 140 shown in FIG. 2. The virtual network policy 140 resides in first host 12, second host 14, virtual machine manager 22 and virtualization gateway 120 and is associated with the first virtual network 112. Virtual network 112 includes virtual machines 100, 102 and 106 and may include other virtual machines (not shown). Each entry in virtual network policy 140 includes a mapping policy comprising a customer address AA and a provider address LA.

In the example of FIGS. 2 and 3, the physical resources including physical server 124 and storage devices 126 and 128 are dedicated to the first virtual network 112 including virtual machines 100, 102 and 106. Accordingly, virtual network policy 140 includes an entry for each of virtual machines 100, 102 and 106, an entry for physical server 124 and entries for storage devices 126 and 128. As shown in FIG. 2, physical server 124 is assigned customer address $AA_{P1}$, storage device 126 is assigned customer address $AAP_2$, and storage device 128 is assigned customer address $AA_{P3}$. Further, physical server 124 and storage devices 126 and 128 each map to the provider address $LA_{GW}$ of gateway 120. Each entry in the virtual network policy 140 may include additional information as needed. It will be understood that the virtual network policy may have any structure, such as a table, that contains the mapping information.

As noted above, virtual network policy 140 includes a policy mapping entry for each virtual machine and each physical resource in the first virtual network 112. Additional virtual network policies correspond to additional virtual networks. For example, a separate virtual network policy in first host 12 and second host 14 contains mapping policies for the second virtual network 114 including virtual machines 104, 108 and 110.

As shown in FIG. 3, virtualization gateway 120 may include a virtualization module 160 and an IP forwarding module 162. Gateway 120 may further include a network interface card (NIC) 164 connected to data center fabric 20 and a network interface card 166 connected to network 122. NIC 164 enables communication through data center fabric 20 to virtual network 112. NIC 166 enables communication through network 122 to physical server 124 and storage devices 126 and 128. As indicated by arrow 168, virtualization module 160 communicates with virtual machine manager 22. Virtual machine manager 22 provides virtualization manager 160 with mapping policies that define address translations in accordance with embodiments of the invention.

In the embodiment of FIGS. 2 and 3, physical server 124 and storage devices 126 and 128 are dedicated to virtual network 112 and communicate only with virtual network 112. Physical server 124 and storage devices 126 and 128 are assigned customer addresses $AA_{P1}$, $AA_{P2}$ and $AA_{P3}$, respectively. Thus, physical server 124 and storage devices 126 and 128 may be considered as part of the address space of virtual network 112. The address space for virtual network 112 may be divided into a first part including virtual machines 100, 102 and 106 and a second part including physical server 124 and storage devices 126 and 128. When virtualization module 160 identifies a packet addressed to one of physical server 124 and storage devices 126 and 128, the packet is sent through network interface card 166 and network 122 to its destination. When virtualization module 160 identifies a packet addressed to one of virtual machines 100, 102 and 106, the packet is sent through network interface card 164 and data center fabric 20 to its destination.

Figure 4:
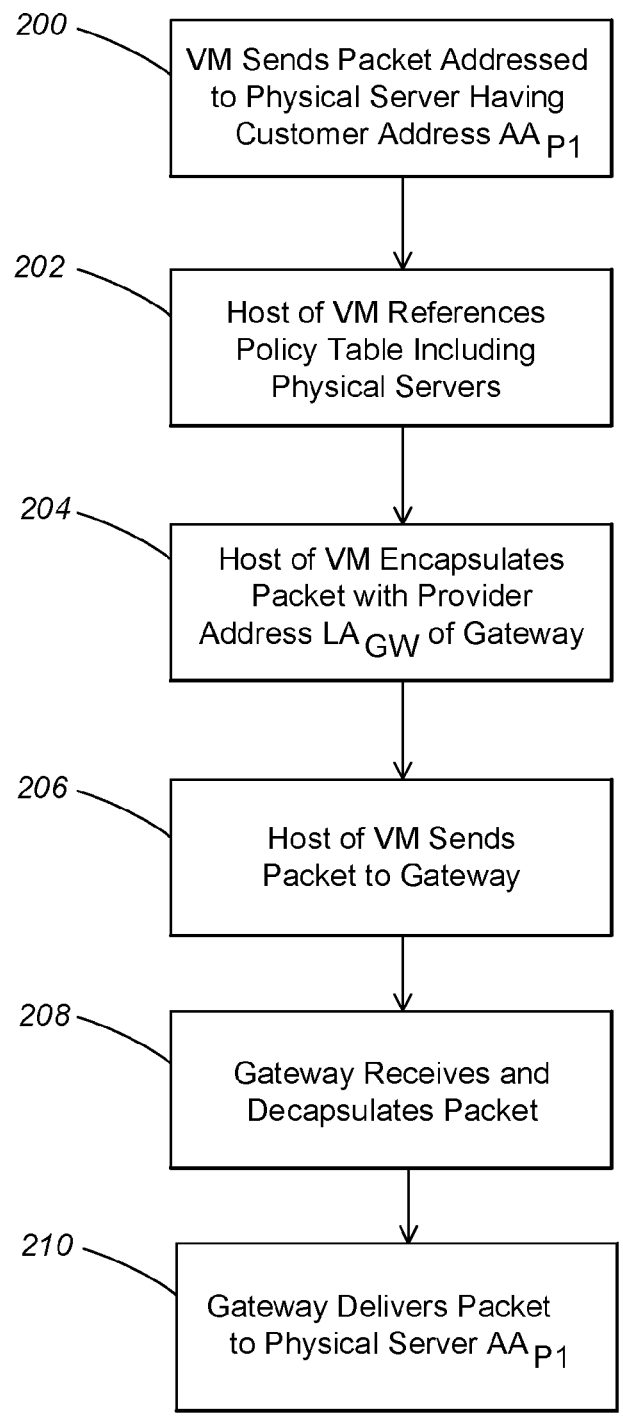
FIG. 4 is a flowchart that illustrates communication between a virtual machine and a dedicated physical server, in accordance with embodiments of the invention.

FIG. 4 is a flowchart that illustrates a process for communication between a virtual machine and a dedicated physical server, in accordance with embodiments of the invention. In particular, virtual machine 100 sends a packet to physical server 124.

In act 200, virtual machine 100 sends a packet 220 (arrow (1) in FIG. 2) addressed to physical server 124 at customer address $AA_{P1}$ ($AA_1 \rightarrow AA_{P1}$). In act 202, first host 12 of virtual machine 100 references virtual network policy 140 which includes a mapping policy for physical server 124 at customer address $AA_{P1}$. The mapping policy indicates that a packet addressed to physical server 124 is directed to the provider address $LA_{GW}$ of gateway 120.

In act 204, first host 12 of virtual machine 100 may encapsulate the packet with the provider address $LA_{GW}$ of gateway 120 ($LA_1 \rightarrow LA_{GW}$) to provide an encapsulated packet 222 (FIG. 2). In act 206, first host 12 of virtual machine 100 sends the packet, which has been processed by address encapsulation to gateway 120 (arrow (2) in FIG. 2).

In act 208, gateway 120 receives the encapsulated packet 222 from first host 12 and decapsulates the packet to provide a decapsulated packet 224. In particular, the provider address portion of the packet is removed, leaving the customer address $AA_{P1}$ of physical server 124. In act 210, gateway 120 delivers the decapsulated packet 224 to physical server 124 (arrow (3) in FIG. 2). The virtual network policy of gateway 120 provides a mapping policy between the provider address $LA_{GW}$ of gateway 120 and the customer address $AA_{P1}$ of physical server 124.

Figure 5:
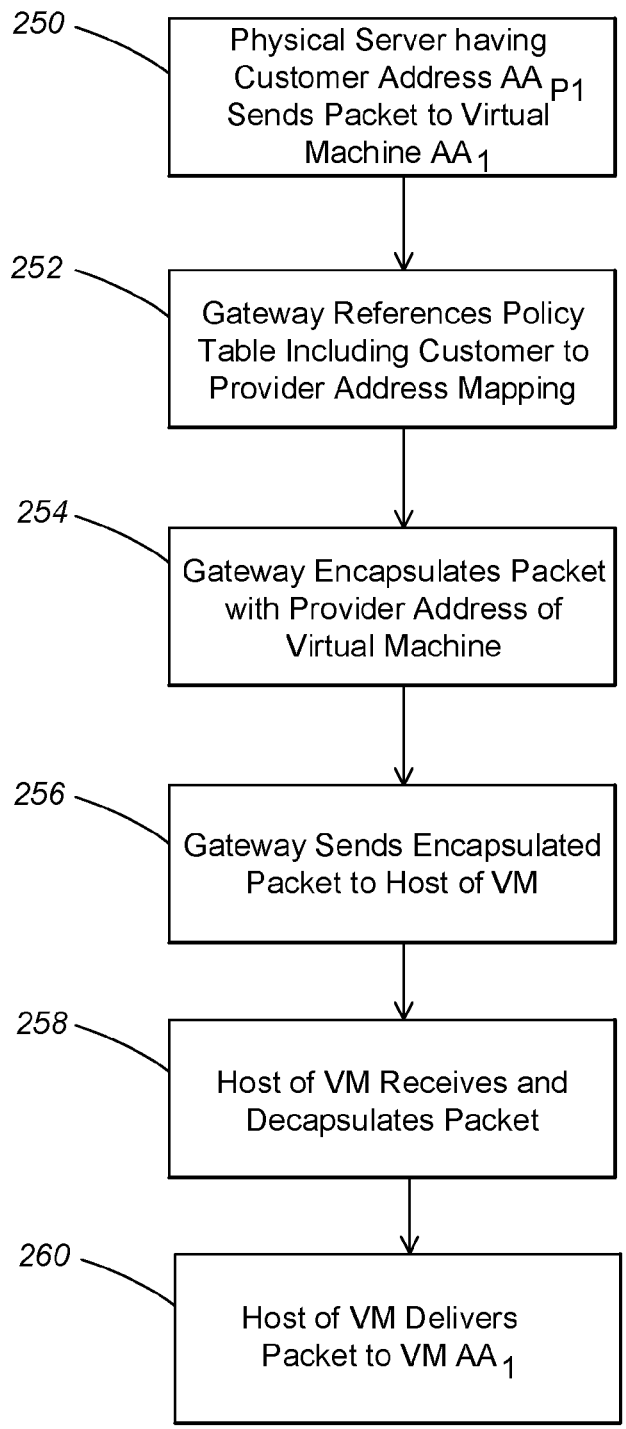
FIG. 5 is a flowchart that illustrates communication between a physical server and a virtual machine in the virtualized network, in accordance with embodiments of the invention.

FIG. 5 is a flowchart that illustrates a process for communication between a physical server and a virtual machine in a virtualized network, in accordance with embodiments of the invention. In the embodiment of FIG. 5, physical server 124 sends a packet to virtual machine 100 in first virtual network 112. The process is essentially the reverse of the process shown in FIG. 4 and described above.

In act 250, physical server 124 having address $AA_{P1}$ sends a packet to virtual machine 100 having customer address $AA_1$. In act 252, gateway 120 references its virtual network policy to obtain a mapping from customer address $AA_1$ of virtual machine 100 to provider address $LA_1$ of virtual machine 100. In act 254, gateway 120 may encapsulate the packet with the provider address of virtual machine 100 ($LA_{GW} \rightarrow LA_1$). In act 256, gateway 120 sends the encapsulated packet to host 12 of virtual machine 100.

In act 258, host 12 of virtual machine 100 receives the packet and decapsulates the packet according to the mapping policy in virtual network policy 140, which relates provider address $LA_1$ of virtual machine 100 to customer address $AA_1$ of virtual machine 100. In act 260, the decapsulated packet is delivered to virtual machine 100 at customer address $AA_1$.

Figure 6:
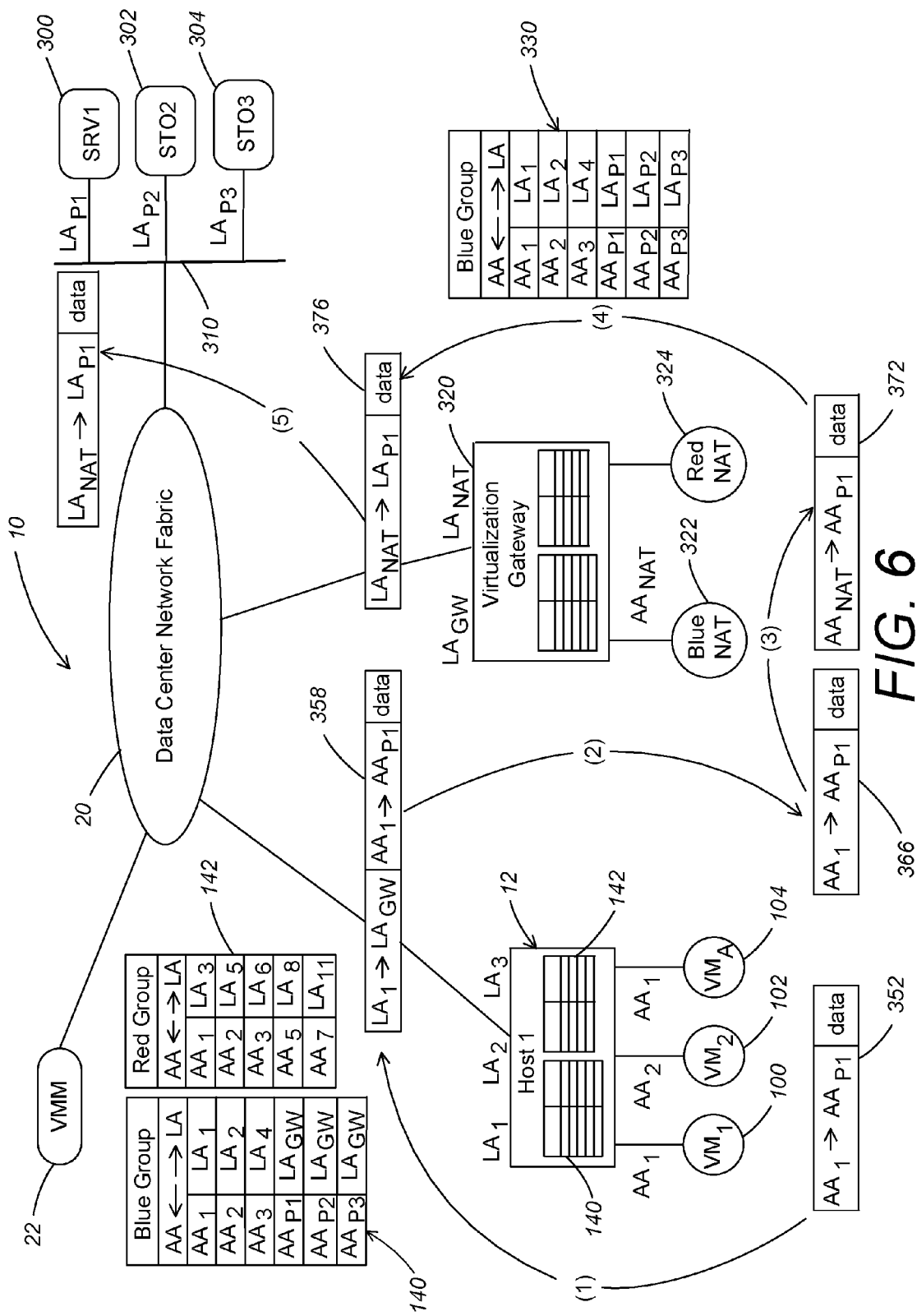
FIG. 6 is a schematic block diagram of an embodiment of a data center, illustrating communication between a virtual machine and a shared physical resource.
Figure 7:
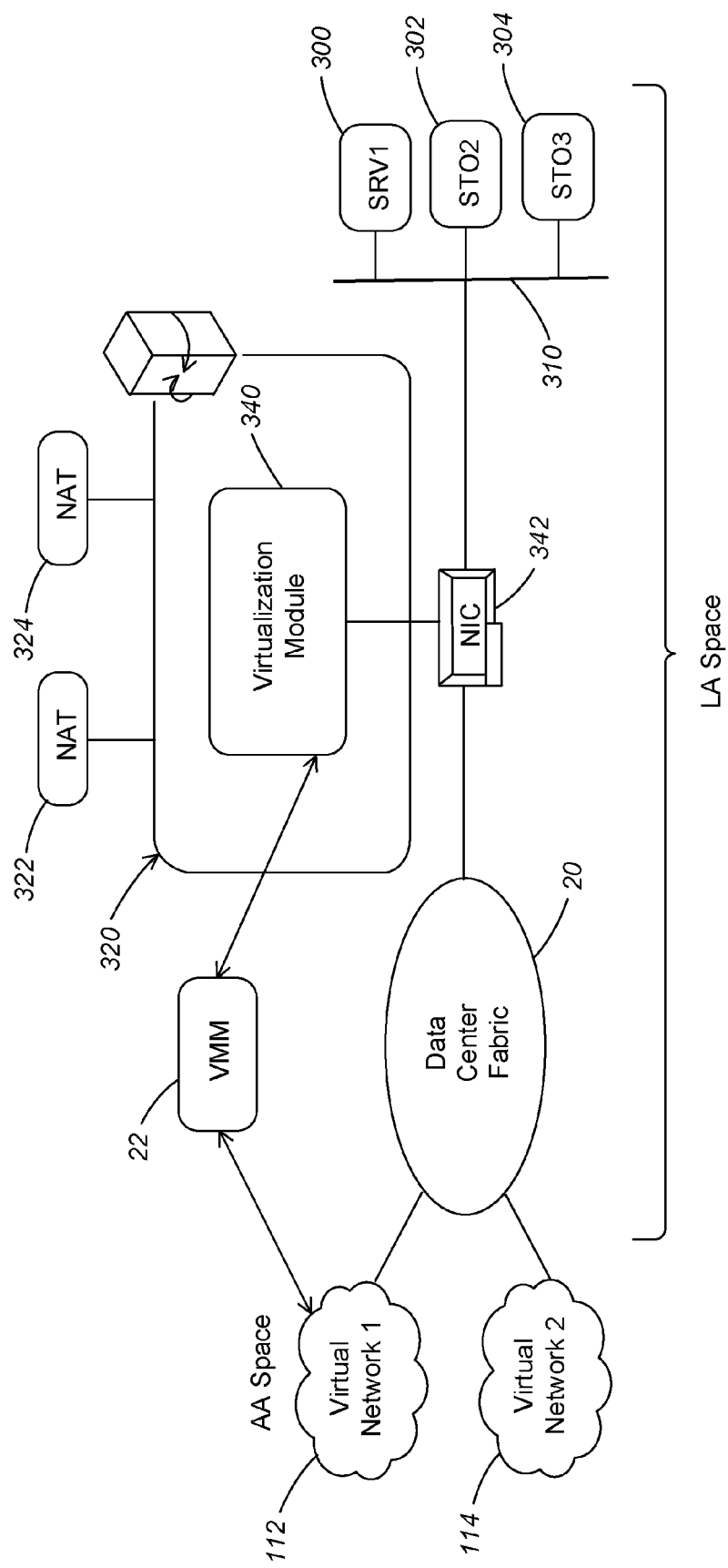
FIG. 7 is a schematic block diagram, illustrating an embodiment of the virtualization gateway of FIG. 6.

A third embodiment of data center 10 is shown in FIGS. 6 and 7. In the embodiment of FIGS. 6 and 7, first host 12 hosts virtual machines 100, 102 and 104 as described above. Virtual machines 100 and 102 are elements of first virtual network 112 (FIG. 7), and virtual machine 104 is an element of second virtual network 114. As indicated above, virtual networks 112 and 114 may include additional elements (not shown).

As further shown in FIGS. 6 and 7, data center 10 includes a physical server 300 and storage devices 302 and 304. The physical server 300 and the storage devices 302 and 304 may correspond to physical server 124 and storage devices 126 and 128, respectively, shown in FIGS. 2 and 3. However, physical server 300 and storage devices 302 and 304 have a different addressing scheme from the physical resources shown in FIGS. 2 and 3. Physical server 300 and storage devices 302 and 304 are connected through a network 310 to data center network fabric 20 and have provider addresses $LA_{P1}$, $LA_{P2}$ and $LA_{P3}$, respectively.

As further shown in FIGS. 6 and 7, data center 10 includes a virtualization gateway 320 which hosts a first NAT (Network Address Translation) module 322 and a second NAT module 324. First NAT module 322 operates with first virtual network 112, and second NAT module 324 operates with second virtual network 114. The NAT modules enable sharing of physical resources by different virtual networks, as described below.

As shown in FIG. 6, first host 12 includes virtual network policy 140 including mapping policies between customer addresses and provider addresses in first virtual network 112. First host 12 also includes a second virtual network policy 142 including mapping policies between customer addresses and provider addresses in second virtual network 114. As shown, virtual network policy 140 maps customer addresses $AA_{P1}$, $AA_{P2}$ and $AA_{P3}$ to the provider address $LA_{GW}$ of virtualization gateway 320. Virtualization gateway 320 includes a virtual network policy 330 which differs from virtual network policy 140 by mapping customer addresses $AA_{P1}$, $AA_{P2}$ and $AA_{P3}$ of the physical resources to provider addresses $LA_{P1}$, $LA_{P2}$ and $LA_{P3}$, respectively. As shown in FIG. 7, virtualization gateway 320 includes a virtualization module 340 and a network interface card 342. The network interface card 342 is coupled to data center fabric 20 and is coupled through network 310 to physical server 300 and storage devices 302 and 304.

Figure 8:
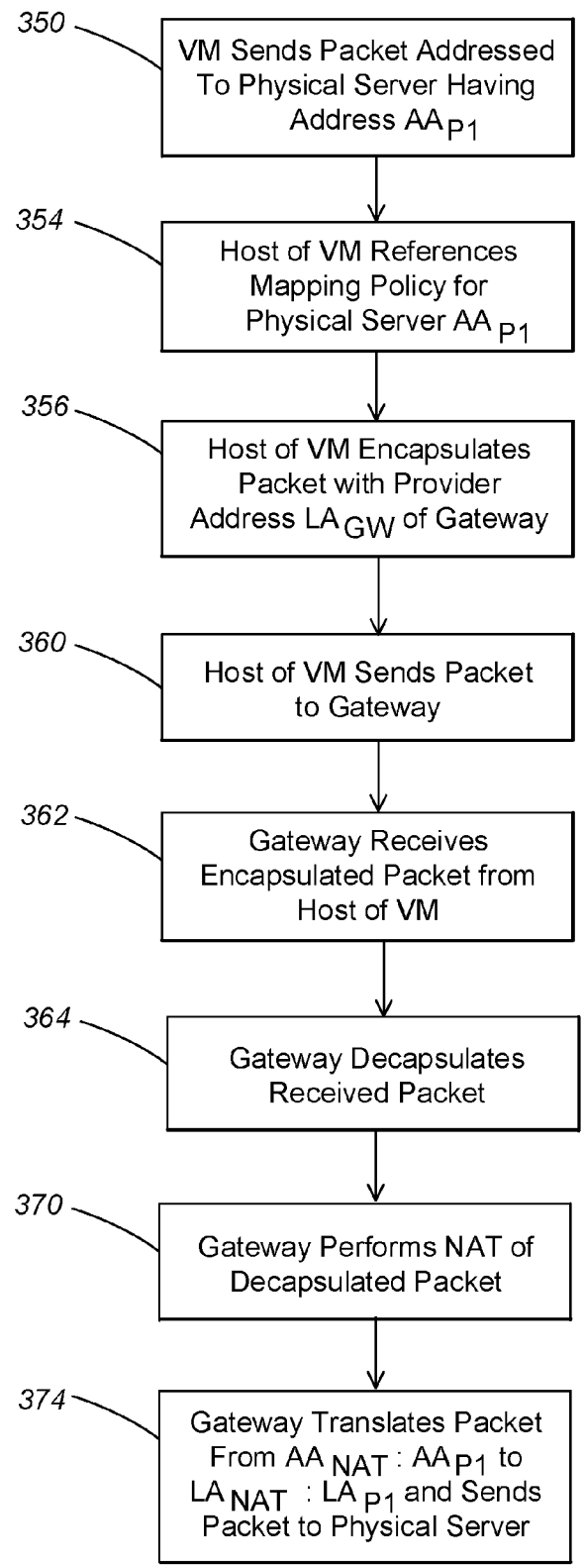
FIG. 8 is a flowchart that illustrates communication between a virtual machine and a shared physical resource, in accordance with embodiments of the invention.

FIG. 8 is a flowchart of a process for communication between a virtual machine and a shared physical resource, in accordance with embodiments of the invention. The acts of the process are indicated by corresponding arrows in FIG. 6.

In act 350, the virtual machine 100 sends a packet 352 (arrow (1) in FIG. 6) addressed to physical server 300 at customer address $AA_{P1}$. In act 354, first host 12 of virtual machine 100 references a mapping policy in virtual network policy 140 which corresponds to physical server 300. First host 12 determines that physical server 300 at customer address $AA_{P1}$ maps to provider address $LA_{GW}$ of virtualization gateway 320.

In act 356, first host 12 encapsulates the packet with the provider address $LA_{GW}$ of gateway 320 to provide packet 358 (FIG. 6). In act 360, first host 12 sends the encapsulated packet 358 to gateway 320.

In act 362, gateway 320 receives the encapsulated packet 358 from first host 12 of virtual machine 100. In act 364, gateway 320 decapsulates received packet 358 to provide decapsulated packet 366 (arrow (2) in FIG. 6). In act 370, the first NAT module 322 of gateway 320 performs network address translation of decapsulated packet 366 to provide an NAT packet 372 (arrow (3) in FIG. 6). The NAT packet 372 is in the customer address space and indicates that customer address $AA_{NAT}$ is sending a packet to physical server 300 at address $AA_{P1}$. In act 374, gateway 320 rewrites the NAT packet 372 from the customer address space to the provider address space to provide NAT packet 376 (arrow (4) in FIG. 6). The NAT packet 376 indicates that provider address $LA_{NAT}$ is sending a packet to physical server 300 at provider address $LA_{P1}$. Gateway 320 sends the NAT packet 376 to physical server 300 at provider address $LA_{P1}$ (arrow (5) in FIG. 6).

After the first NAT module 322 has established an entry corresponding to virtual machine 100, the physical server 300 can send a reply packet to virtual machine 100 using the reverse of the operations shown in FIG. 8 and described above. In a similar procedure, virtual machine 104 in second virtual network 114 can send a packet to physical server 300 using the second NAT module 324.

As indicated above, virtual machine hosts in data center 10 include mapping policies which map physical servers to the provider address of gateway 320. In contrast, gateway 320 includes mapping policies which map the customer addresses of the physical resources to corresponding provider addresses. In addition, the first host 12 encapsulates packets directed to gateway 320, whereas the gateway 320 rewrites packets directed to physical server 300. In particular, virtual network policy 140 in first host 12 includes mapping policies for address encapsulation of packets sent to gateway 320, and virtual network policy 330 in virtualization gateway 330 includes mapping policies for address rewriting of packets sent to the physical resources.

Figure 9:
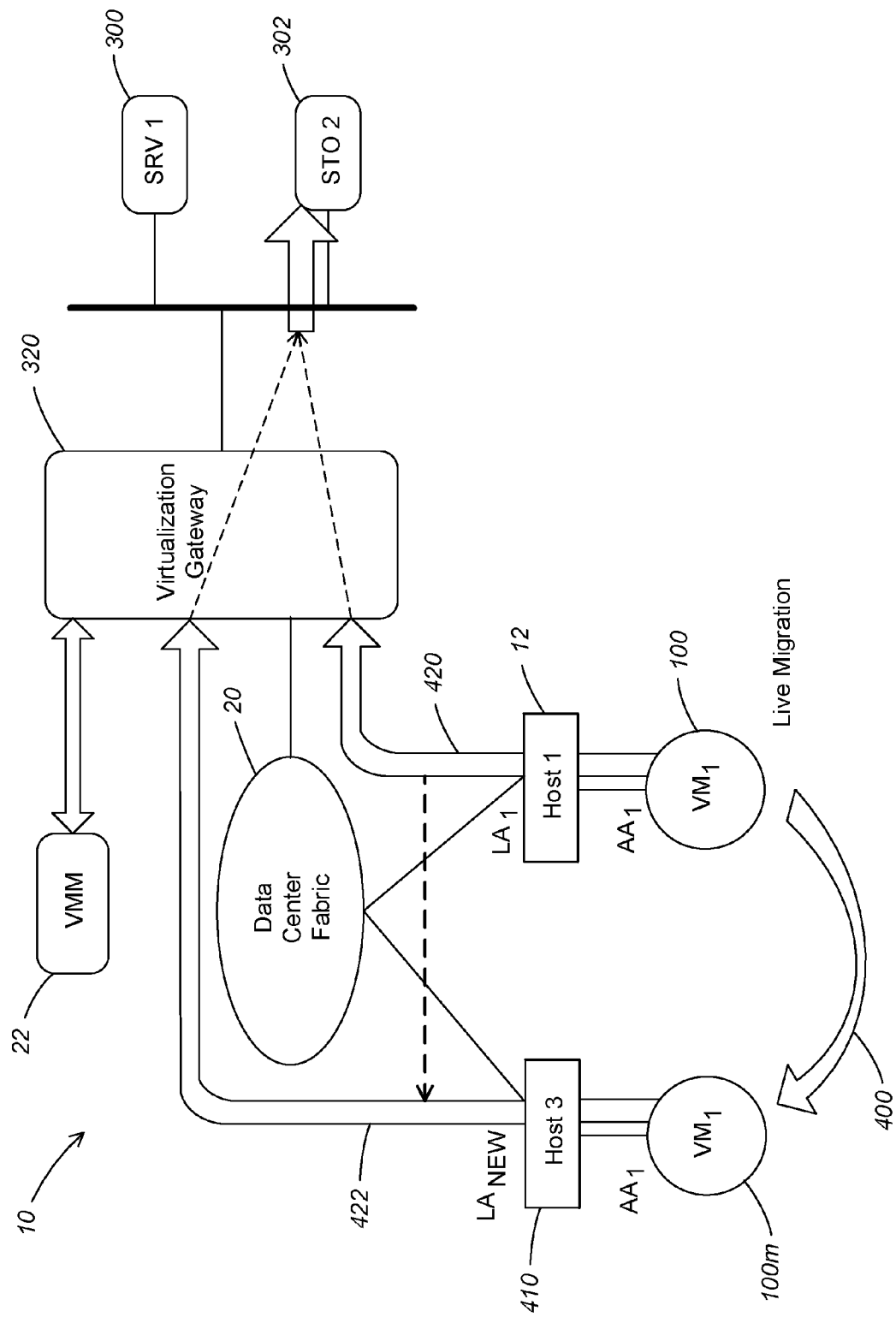
FIG. 9 is a schematic block diagram of an embodiment of a data center, illustrating communication between a virtual machine and a shared physical resource in the case of live migration of the virtual machine.

FIG. 9 is a schematic block diagram of an embodiment of a data center, illustrating communication between a virtual machine and a shared physical resource in the case of live migration of the virtual machine. As shown in FIG. 9, virtual machine 100 is transferred by live migration, as indicated by arrow 400, from first host 12 to third host 410. Live migration allows the transfer of a running virtual machine from one host to another host without significant disruption of the operation of the virtual machine. The live migration may be controlled by virtual machine manager 22.

The customer address $AA_1$ of migrated virtual machine $100_m$ remains unchanged, but the provider address of migrated virtual machine $100_m$ changes from provider address $LA_1$ to provider address $LA_{NEW}$ in the example of FIG. 9. The new provider address $LA_{NEW}$ of migrated virtual machine $100_m$ is reflected in the virtual network policy of each host and virtualization gateway 320 of the virtual network in order to avoid packet loss. Accordingly, the mapping policy in each of the hosts and gateway 320 in the virtual network is updated following the live migration.

Prior to live migration, virtual machine 100 on first host 12 sends a packet to storage device 302, as indicated by arrow 420 in FIG. 9, using the process shown in FIGS. 6-8 and described above. The virtualization gateway 320 receives the encapsulated packet from first host 12 and performs decapsulation and network address translation of the packet to provide a NAT packet. The NAT packet is translated to a provider address $LA_{NAT}$ and is sent to storage device 302.

Following live migration, it is assumed that virtual network policy 330 in gateway 320 has been updated to reflect the new mapping policy of migrated virtual machine $100_m$. In particular, virtual network policy 330 includes an address pair $AA_1$:$LA_{NEW}$, which defines a mapping policy for migrated virtual machine $100_m$. If migrated virtual machine $100_m$ sends a packet to storage device 302, the packet is encapsulated by third host 410 and is sent to gateway 320, as indicated by arrow 422. Gateway 320 verifies the updated mapping policy for migrated virtual machine $100_m$ and performs decapsulation and network address translation as shown in FIGS. 6-8 and described above. After network address translation, the NAT packet is translated to provider address $LA_{NAT}$ and is sent to storage device 302. Thus, the packet appears to be received by storage device 302 from provider address $LA_{NAT}$ before and after live migration.

In effect, the network address translation masquerades the changes of the provider address of virtual machine 100 while maintaining connections between the virtual machine 100 and the physical resource. The virtual network policy 330 insures the correct mapping of provider addresses for virtual machine 100 before and after live migration. With this approach, live migration is transparent to the physical servers, as they only see the NAT address $LA_{NAT}$.

Figure 10:
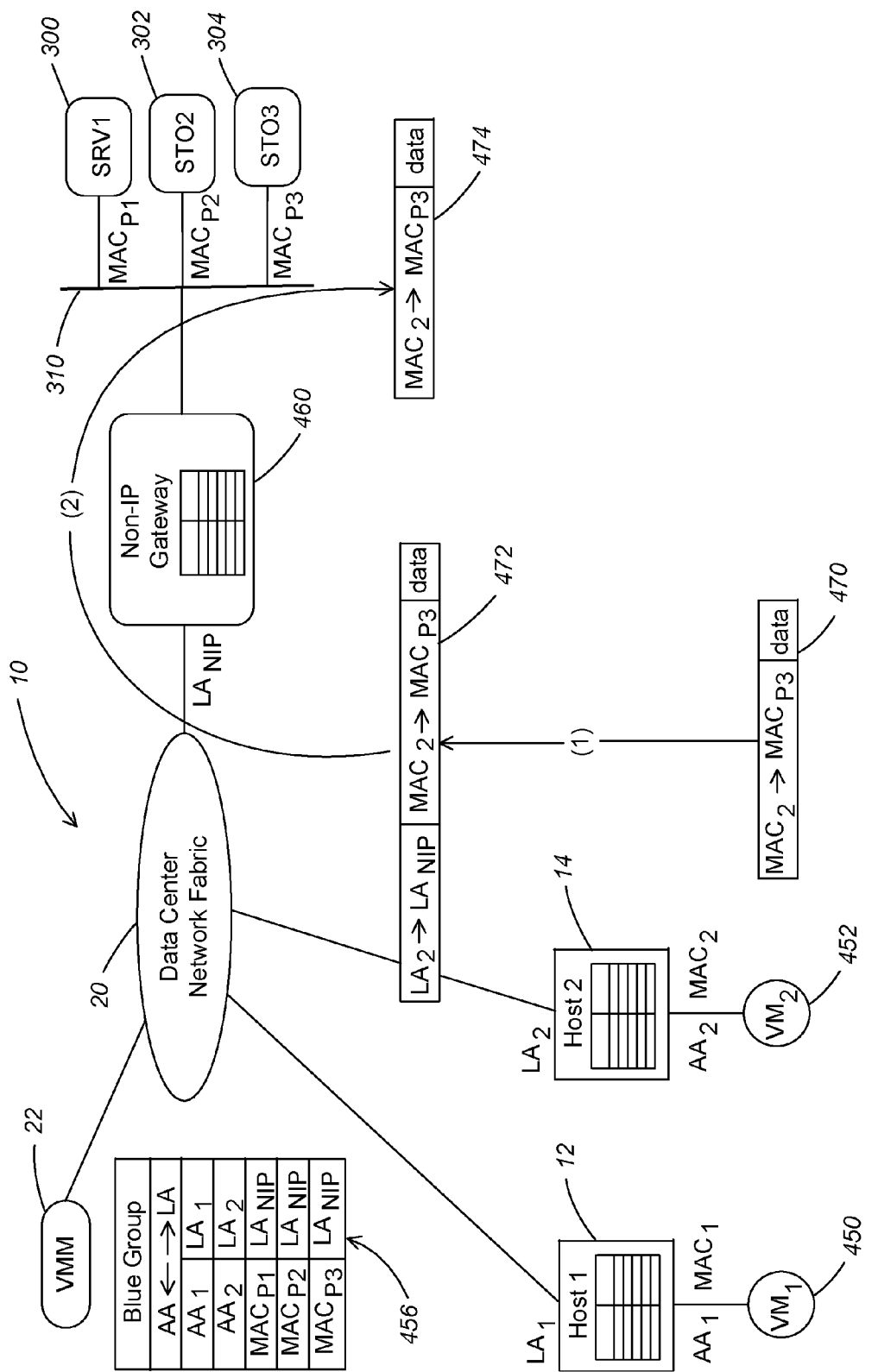
FIG. 10 is a schematic block diagram of an embodiment of a data center, illustrating communication between a virtual machine and a Non-IP resource.

FIG. 10 is a schematic block diagram of an embodiment of a data center, illustrating communication between a virtual machine and a Non-IP resource. In data center 10 of FIG. 10, first host 12 hosts virtual machine 450, and second host 14 hosts virtual machine 452. Non-IP resources, including physical server 300 and storage devices 302 and 304, are connected through network 310 and Non-IP gateway 460 to data center network fabric 20. First host 12 includes a virtual network policy 456 having mapping policies for address encapsulation of packets sent to the Non-IP resources.

As further shown in FIG. 10, virtual machine 452 sends a packet 470 to storage device 304 (arrow (1) in FIG. 10). The virtual machine 452 uses Ethernet MAC addresses in addressing the packet. In particular, virtual machine 452 uses the MAC address of storage device 304 ($MAC_2 \rightarrow MAC_{P3}$). The packet 470 is encapsulated by second host 14 with the provider address $LA_{NIP}$ of gateway 460 to provide encapsulated packet 472. The encapsulated packet 472 is sent to gateway 460 and is decapsulated to provide decapsulated packet 474 (arrow (2) in FIG. 10). The decapsulated packet 474 is sent by gateway 460 to storage device 304.

Figure 11:
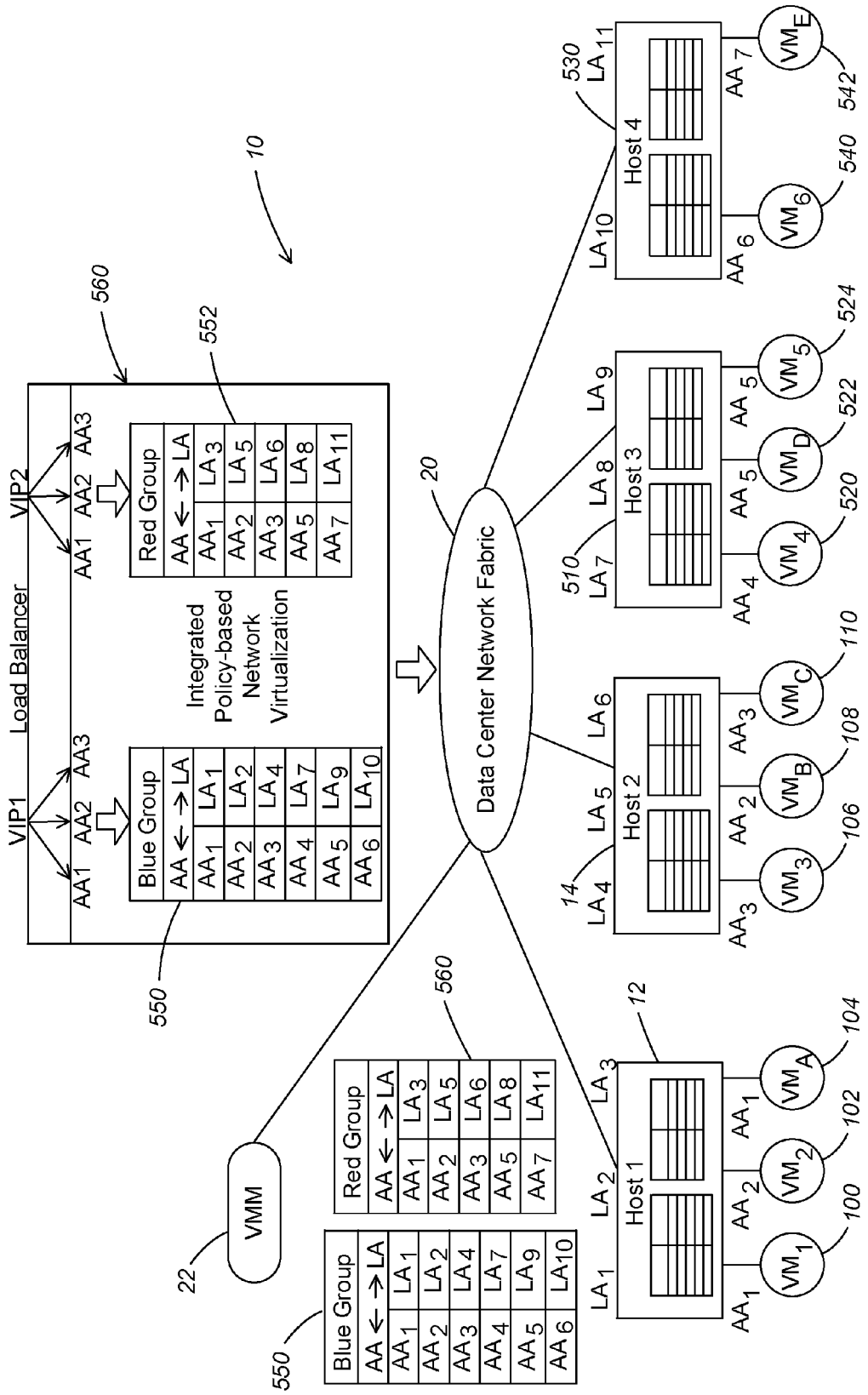
FIG. 11 is a schematic block diagram of an embodiment of a data center, illustrating a load balancer provisioned with virtualization gateway functionality.

FIG. 11 is a schematic block diagram of a data center, illustrating a load balancer provisioned with virtualization gateway functionality. In data center 10 of FIG. 11, first host 12 hosts virtual machines 100, 102 and 104; second host 14 hosts virtual machines 106, 108 and 110; third host 510 hosts virtual machines 520, 522 and 524; and fourth host 530 hosts virtual machines 540 and 542. Virtual machines 100, 102, 106, 520, 524 and 540 are elements of a first virtual network, as represented by a virtual network policy 550. Virtual machines 104, 108, 110, 522 and 542 are elements of a second virtual network, as represented by a virtual network policy 552.

A load balancer 560 is coupled between the Internet and the data center network fabric 20. Load balancer 560 includes policy-based network virtualization and contains virtual network policies 550 and 552.

As shown in FIG. 11, one embodiment of the gateways is to integrate the virtualization gateway functionality into a load balancer, to implement a multi-tenant, virtualization-aware load balancer. Existing load balancers perform the "balancing" by spreading queries to one external-facing IP address, called VIP, to a set of backend server workloads represented by different DIPs, for Direct IP. A load balancer integrated with the virtualization functionality can work in the following way. The external facing side of the load balancer is configured with multiple VIPs, one per customer. Each VIP can map to a set of DIPs, in the AA address space of the given customer. The set of AA DIPs is indexed by the customer identifier, which can be used to direct the traffic to the correct AA-LA mapping policies of virtualization. For example, the load balancer can have two VIP addresses: $VIP_A$=128.1.1.1 for Customer A, and $VIP_B$=128.1.1.2 for Customer B. The load balancing algorithm for Customer A (128.1.1.1) is to spread evenly to a set of two Customer A VM AA's: 10.1.1.1 and 10.1.1.2 for customer A, whereas for the Customer B (128.1.1.2) the mapping is to two Customer B VM AA's: also 10.1.1.1 and 10.1.1.2.

The load balancer indexes the load balancing tables separately for $VIP_A$ and $VIP_B$ such that the correct virtualization mapping tables for Customer A and Customer B will be used for any incoming request. For example, the Customer A's AA's: 10.1.1.1 and 10.1.1.2 can be mapped to $LA_1$ and $LA_2$, whereas the Customer B's AA's 10.1.1.1 and 10.1.1.2 can be mapped to $LA_3$ and $LA_4$. This way the load balancing functionality can be seamlessly integrated with the internal data center virtualization policy. As described previously, an advantage of the integrated architecture of the gateway is that the virtualization module of the gateway will also be part of the data center virtualization policy framework, through VM deployment and live migration. One benefit is that now the backend workload can be migrated across physical subnets, as long as the AA-LA mapping table in the integrated load balancer is also updated. All of these can happen without breaking existing load balancing or proxy sessions because the DIPs, which are AA's for VMs, remain unchanged.

To support IP multicast in a multi-tenant environment, the management servers can assign each customer virtual network a multicast address in the LA space. All multicast traffic from customer VMs will be encapsulated and redirected onto the customer-specific multicast groups (or addresses) in the data center. Isolation of multicast traffic is also achieved by this separate multicast group for each customer. For example, the data center administrator, using a management tool such as VMM, can assign 224.0.0.1 for customer A, and 224.0.0.2 for customer B. While VMs for customer A and customer B both send multicast traffic destined to multicast group (destination address) 224.1.2.3, the virtualization rule will specify the following:

(Policy 1) Packets sent to any multicast or broadcast destination from customer A's VMs→Encapsulate with 224.0.0.1

(Policy 2) Packets sent to any multicast or broadcast destination from customer B's VMs→Encapsulate with 224.0.0.2

Based on these policies, a packet sent by customer A from $AA_{A1}$ to 224.1.2.3 will be encapsulated with $LA_{A1}$ to 224.0.0.1, and a packet sent by customer B from $AA_{B1}$ to 224.1.2.3 will be encapsulated with $LA_{B1}$ to 224.0.0.2. As long as all physical hosts of customer A's VMs all subscribe to 224.0.0.1, and all physical hosts of customer B's VMs all subscribe to 224.0.0.2, the multicast packets reach all the hosts for customer A's and customer B's VMs respectively. Upon receiving the multicast packets, the virtualization policy will also differentiates the packets sent to 224.0.0.1 to be destined for VMs of customer A, whereas 224.0.0.2 to be destined for VMs of customer B. The packets will get decapsulated, and indicated to the correct VMs based on the virtualization rules.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of a computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices.

Figure 12:
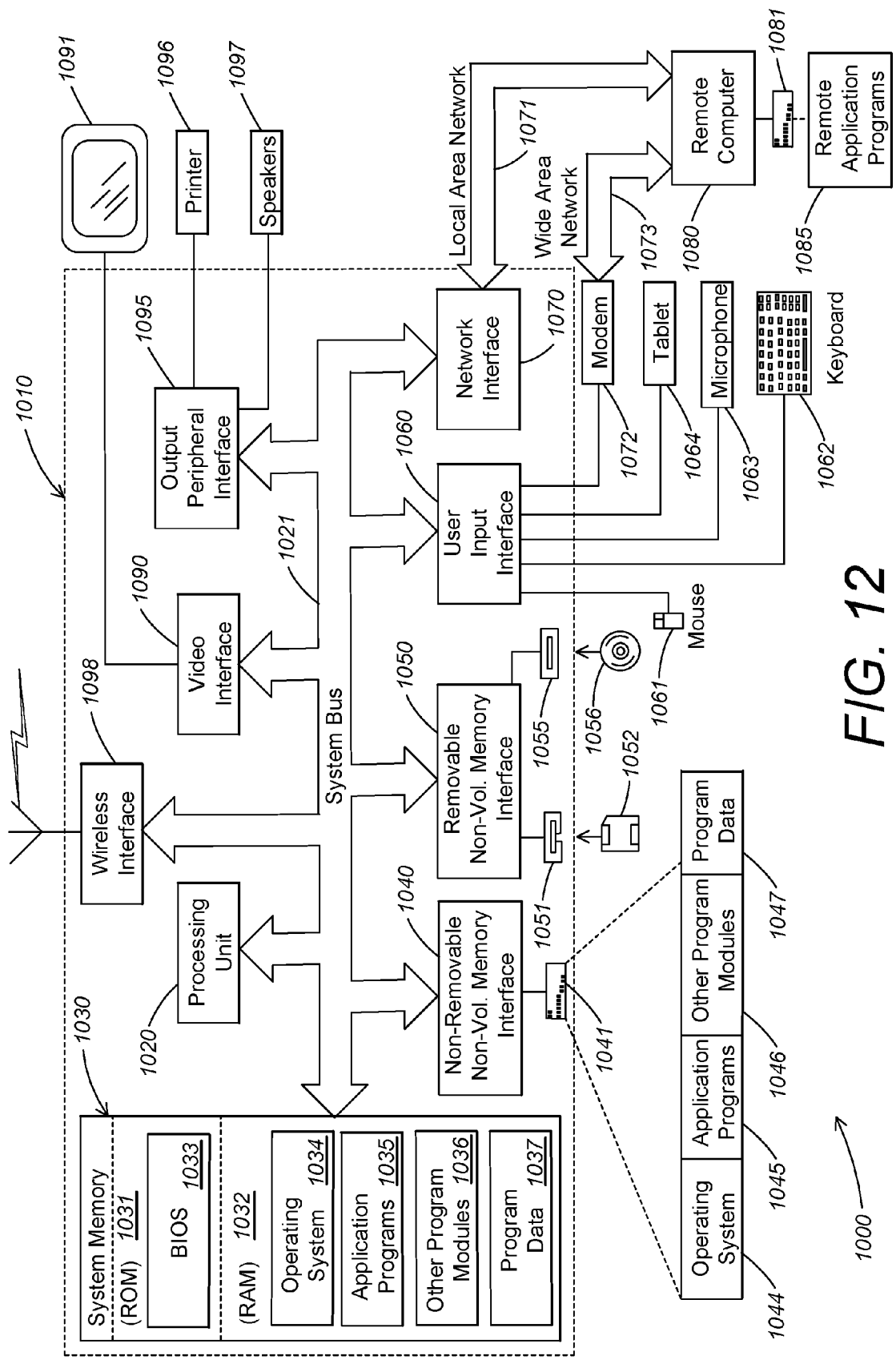
FIG. 12 is a schematic block diagram of an embodiment of a computing device.

With reference to FIG. 12, an exemplary system for implementing the invention includes a general purpose computing device in the form of a computer 1010. The computing device of FIG. 12 can be used for implementing the hosts, the virtual machine manager and any other computing devices described herein. Components of computer 1010 may include, but are not limited to, a processing unit 1020, a system memory 1030, and a system bus 1021 that couples various system components including the system memory to the processing unit 1020. The system 1021, may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Combinations of the any of the above should also be included within the scope of computer readable storage media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 12 illustrates operating system 1034, application programs 1035, other program modules 1036, and program data 1037.

The computer 1010 may also include other removable/non-removable volatile/nonvolatile computer storage media. By way of example only, FIG. 12 illustrates a hard disk drive 1040 that reads from or write to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, discussed above and illustrated in FIG. 12, provide storage of computer readable instructions, data structures, program modules and other data for the computer 1010. In FIG. 12, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and pointing device 1061, commonly referred to as a mouse, trackball or touch pad. Other input devices may include a microphone 1063, joystick, a tablet 1064, satellite dish, scanner, or the like. These and other input devices are often connected to the processing unit 1020 through a user input interface 1060 that is coupled to the system bus, but may not be connected by other interface and bus structures, such as a parallel port, game port or a universal serial bus (USB). A monitor 1091 or other type of display device is also connected to the system 1021 via an interface, such as a video interface 1090. In addition to the monitor, computers may also include other peripheral output devices such as speakers 1097 and printer 1096, which may be connected through a output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 12. The logical connections depicted in FIG. 12 include a local area network (LAN) 1071 and a wide area network (WAN) 1073 and a wireless link, for example via a wireless interface 1098 complete with an antenna, but may also include other networks. Such networking environments are commonplace in offices, enterprise-wide computer networks, intranets and the Internet. While wireless interface 1098 is shown directly connected to system bus 1021, it is recognized that the wireless interface 1098 may be connected to system bus 1021 via network interface 1070.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 12 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed by a gateway, the gateway comprising a first network interface connecting the gateway to a physical network of a cloud data center, the gateway comprising a second network interface connecting the gateway to an external network, the gateway configured to perform:
    operations to facilitate communication between VMs of the cloud data center and external devices on the external network that is external to the cloud data center, the operations comprising:
        storing mapping policies for respective tenants of the cloud data center, wherein the mapping policies are updated to reflect migrations of the VMs among physical servers of the cloud data center, the physical servers comprising respective virtualization hypervisors that manage execution of the VMs, the cloud data center comprising a physical network that performs routing for a provider address space (PAS), the physical servers and the first network interface having physical network addresses in PAS, the cloud data center providing customer address spaces (CASs) for the respective tenants thereof, each mapping policy mapping customer addresses (CAs) in a corresponding CAS to provider addresses (PAs) of the physical servers in the PAS;
        receiving, via the external network, by the second network interface, requests sent from the external devices, the requests addressed to external-facing addresses of the second network interface, the external-facing addresses corresponding to the tenants, respectively, wherein the external devices send the requests to the external-facing addresses, the external-facing addresses facing externally with respect to the cloud data center;
        enabling communication between the external devices and a tenant's VMs by:
            (i) for requests sent to the tenant's external-facing address, selecting CAs of the tenant's VMs from the tenant's mapping policy, and
            (ii) for each CA selected for a corresponding request sent to the tenant's external-facing address, using the tenant's mapping policy to map the selected CA to a PA of a physical server hosting the VM of the selected CA, and sending the corresponding request to the mapped PA.

2. A method according to claim 1, wherein when the sent request is received by the physical server corresponding to the mapped PA, the hypervisor of the physical server uses a local version of the tenant's mapping policy to deliver the request to the VM corresponding to the selected CA.

3. A method according to claim 1, wherein the local copy of the tenant's mapping policy is updated to reflect migrations of the tenant's VMs within the cloud data center.

4. A method according to claim 1, the operations further comprising, for a given request from a given external device, selecting a mapping policy for the request according to which external-facing address the given request is addressed to.

5. A method according to claim 1, further comprising balancing load among the tenant's VMs by the selecting the CAs, wherein the load balancing among the tenant's VMs is performed independent of which physical servers the tenant's VMs are hosted on.

6. A method according to claim 1, wherein the sending the corresponding request to the mapped PA comprises encapsulating the corresponding request in a packet addressed to the selected CA.

7. A method according to claim 1, wherein the sending the corresponding request to the mapped PA comprises translating an address of the corresponding request to the selected CA.

8. A method according to claim 1, wherein CAs in the CASs are not routable by the physical network of the cloud data center.

9. A gateway device comprising:
    processing hardware and storage hardware configured to perform operations to facilitate communication between VMs of a cloud data center and external devices on an external network that is external to the cloud data center;
    the processing hardware;
    a first network interface configured to connect the gateway to a physical network of the cloud data center, a second network interface configured to connect the gateway to the external network;
    the storage hardware configured to store mapping policies for respective tenants of the cloud data center, wherein the mapping policies are updated to reflect live migrations of the VMs among physical servers of the cloud data center, the physical servers comprising respective virtualization hypervisors that manage execution of the VMs, the cloud data center comprising a physical network that performs routing for a provider address space (PAS), the physical servers and the first network interface having physical network addresses in PAS, the cloud data center providing customer address spaces (CASs) for the respective tenants thereof, each mapping policy mapping customer addresses (CAs) in a corresponding CAS to provider addresses (PAs) of the physical servers in the PAS;
    the storage hardware storing instructions configured to perform the operations, the operations comprising:
        receiving, via the external network, by the second network interface, packets sent from the external devices, the packets addressed to external-facing addresses of the second network interface, the external-facing addresses assigned to the tenants, respectively, wherein the external devices send the packets to the external-facing addresses;
        enabling communication between the external devices and a tenant's VMs by:
            (i) for packets sent to the tenant's external-facing address, selecting CAs of the tenant's VMs from the tenant's mapping policy, and (ii) for each CA selected for a corresponding packet sent to the tenant's external-facing address, using the tenant's mapping policy to map the selected CA to a PA of a physical server hosting the VM of the selected CA, and sending the corresponding packet to the mapped PA.

10. A gateway device according to claim 9, wherein the enabling communication balances load among the tenant's VMs by the selecting of the CSs of the tenant's VMs, and wherein the load balancing causes packets addressed to the tenant's external-facing address to be distributed among the tenant's VMs.

11. A gateway device according to claim 9, the operations further comprising selecting a mapping policy for a packet received via the external network, wherein the mapping policy is selected based on which external-facing the packet is addressed to.

12. A gateway device according to claim 11, wherein when a VM represented in the mapping policy is migrated from a first physical server to a second physical server, the mapping policy is updated to stop associating the VM with a PA of the first physical server and start associating the VM with a PA of the second physical server.

13. A gateway device according to claim 9, wherein the sending the corresponding packet to the mapped PA comprises performing network translation or network encapsulation.

14. A gateway device according to claim 9, wherein each CAS corresponds to a respective virtual network implemented by the cloud data center.

15. A gateway device according to claim 9, wherein the distribution of the packets to the VMs is not affected by migrations of the VMs.

16. A gateway device according to claim 9, the operations further comprising receiving, via the physical network, packets sent by the VMs via the hypervisors, and using the mapping policies to deliver the packets sent by the VMs to the external devices.

17. A method performed by a gateway, the gateway comprising a first network interface connecting the gateway to a first physical network of a cloud data center, the gateway comprising a second network interface connecting the gateway to a second physical network that is external to the cloud data center, the method comprising:

operations to facilitate communication between VMs of the cloud data center and external devices on the second physical network that is external to the cloud data center, the operations comprising:

implementing a virtual network, the virtual network implemented by hypervisors executing on the server devices, the VMs belonging to the virtual network, wherein the hypervisors provide platform virtualization for the VMs, wherein the virtual network is in a second address space that is not routable on the first physical network, the second address space including addresses of the devices on the second physical network, the second address space also including addresses of the VMs, wherein the first physical network comprises a first address space that includes the addresses of the server devices;

storing a mapping policy, wherein the mapping policy maps the addresses of the VMs in the second address space to the addresses of the server devices in the first address space;

receiving, via the second physical network, by the second network interface, requests sent from the devices, the requests each addressed to a same address of the second network interface, wherein the devices send the requests to the address of the second network interface; and bridging communication between the devices and the VMs by:

(i) for requests sent to the address of the second network interface by the devices, selecting the addresses of the VMs from the mapping policy, and (ii) for each VM address selected for a corresponding request, using the mapping policy to map the selected VM address to an address of a server device hosting the VM of the selected VM address, and sending the corresponding request to the mapped server device address, wherein the hypervisor on the mapped server device delivers the corresponding request to the VM of the selected VM address.

18. A method according to claim 17, wherein the mapping policy maps the address of one of the devices to an address of the gateway.

19. A method according to claim 17, further comprising receiving, at the gateway, updates from a virtual machine manager, the updates corresponding to migrations of the VMs between the server devices, and applying the updates to the mapping policy.

* * * * *